UNITED STATES PATENT OFFICE.

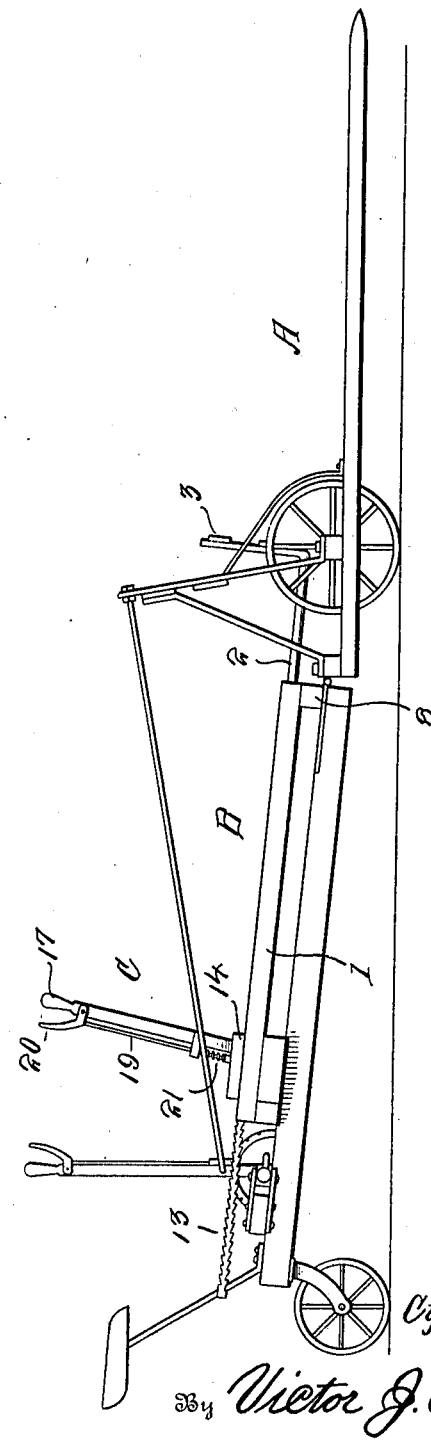

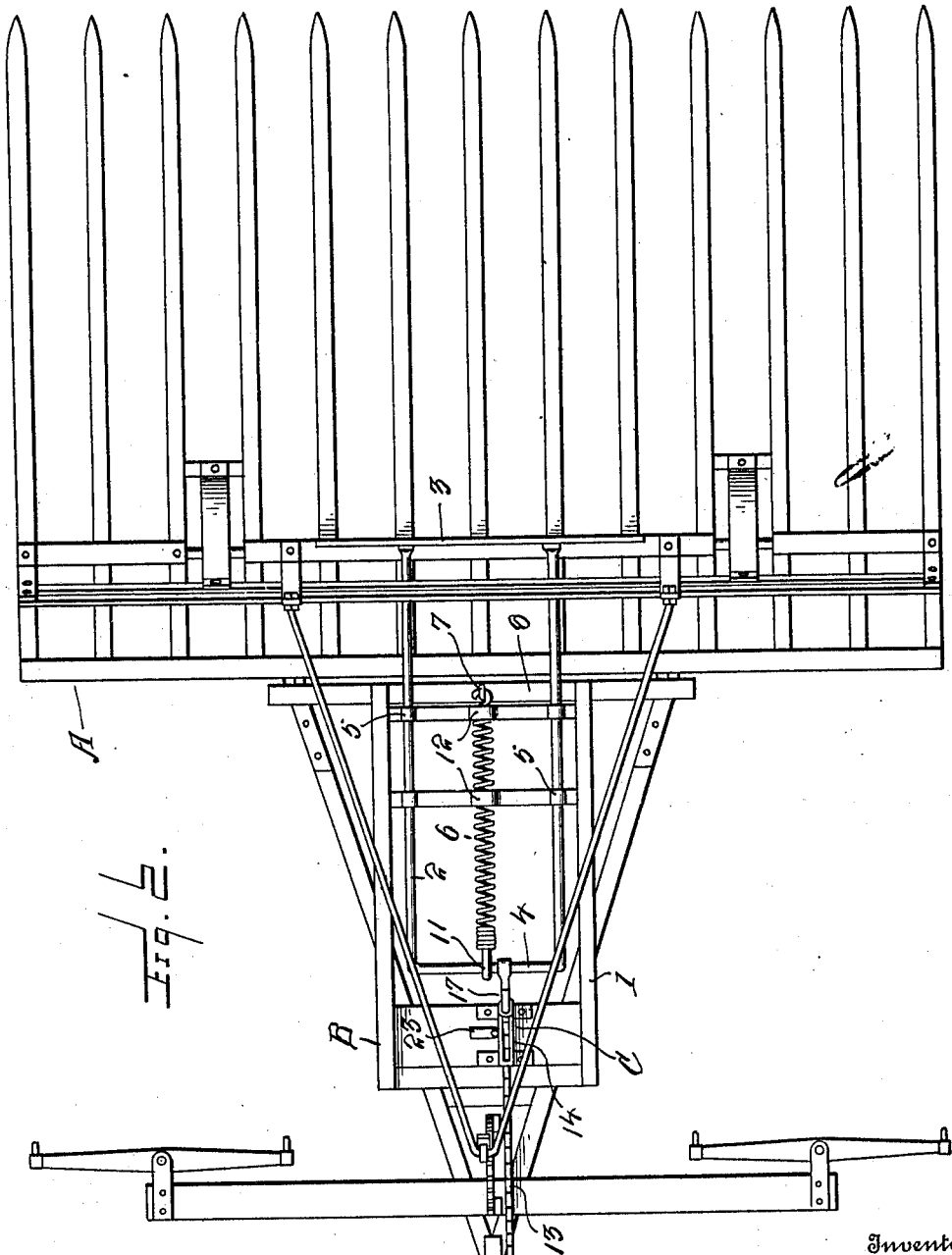

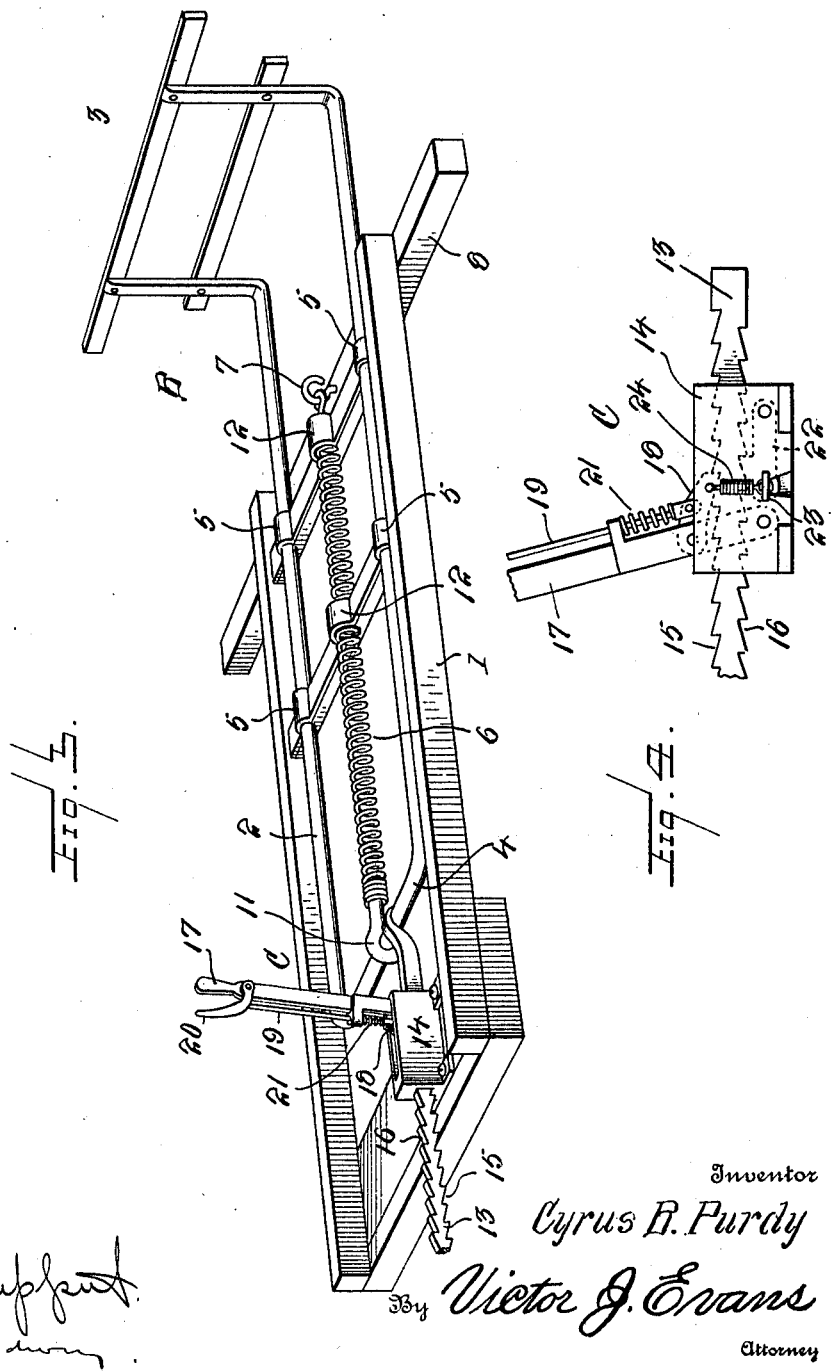

CYRUS B. PURDY, OF MINATARE, NEBRASKA.

HAY-SWEEP.

992,060.   Specification of Letters Patent.   Patented May 9, 1911.

Application filed September 20, 1910. Serial No. 582,880.

*To all whom it may concern:*

Be it known that I, CYRUS B. PURDY, a citizen of the United States, residing at Minatare, in the county of Scotts Bluff and State of Nebraska, have invented new and useful Improvements in Hay-Sweeps, of which the following is a specification.

This invention relates to hay sweeps and relates more particularly to a clearer mechanism for pushing the hay off the rake teeth of the sweep when it is to be discharged to the stacker.

The invention has for one of its objects to improve and simplify the construction and operation of machines of this character so as to be comparatively simple and inexpensive to manufacture, reliable and efficient in use, and readily manipulated.

Another object of the invention is the provision of a clearer for discharging the hay from the rake teeth, such device being in the nature of an attachment capable of use on various types of hay sweeps without altering the construction thereof.

A further object of the invention is the provision of an attachment including a spring-actuated clearer or plunger which discharges the hay from the rake teeth and at the same time re-acts on the sweep so as to push the same backwardly so that the horses will have less work to do in backing the sweep from the stacker.

Another object is the employment of a novel means for retracting the clearer and holding it under tension at any desired point.

With these objects in view and others, as will appear as the description proceeds, the invention comprises the various novel features of construction and arrangement of parts which will be more fully described hereinafter and set forth with particularity in the claims appended hereto.

In the accompanying drawings, which illustrate one embodiment of the invention, Figure 1 is a side view of a portion of the sweep equipped with the attachment. Fig. 2 is a plan view thereof. Fig. 3 is a perspective view of the attachment removed. Fig. 4 is a detail view showing the clearer retracting means.

Similar reference characters are employed to designate corresponding parts throughout the views.

Referring to the drawings, A designates a hay sweep of any approved construction which is equipped with the hay-discharging attachment designated generally by B. This attachment consists of a frame 1 of any suitable structure which rests on and is secured to the frame of the sweep in such position that the operator can readily control the operation of the attachment. On this frame 1 is mounted a clearer that consists of a horizontal U-shaped frame 2 and a vertical head 3 on the forward end of the frame 2. The frame 2 consists of spaced parallel bars connected by a cross bar 4 opposite the head 3 and these bars 2 slide in bearings 5 provided on the frame 1. The head 3 of the clearer is disposed above the rake teeth so as to move forwardly over the same and push the load of hay from the teeth to the stacker. The forward movement of the clearer is effected by a stiff helical extension spring 6 that extends longitudinally of the clearer and is arranged in the same plane with the side bars 2 thereof. The front end of the spring is connected at 7 with the cross beam 8 of the frame 1 and the rear end of the spring is provided with a hook 11 that engages over the cross bar 4 of the clearer, the intermediate portions of the springs being slidable in bearings 12 on the frame 1. When the clearer is in its rearward or retracted position, the spring is under tension and when the clearer is released the spring contracts and pushes the hay off the rake teeth.

Mounted on the rear part of the frame 1 is a mechanism C for retracting the clearer and holding it in any desired position. This mechanism consists of a horizontally-disposed ratchet bar 13 that slides through a boxing 14 fastened to the rear part of the frame 1, the front end of the ratchet bar being formed into a hook for gripping the cross bar 4 of the clearer. The ratchet bar 13 has two sets of ratchet teeth 15 and 16 in the top and bottom, respectively. Pivoted in the boxing 14 is an operating lever 17 that has pivoted thereto a pawl 18 adapted to engage the upper ratchet teeth 15. This pawl is connected with a rod 19 slidably mounted on the operating lever and connected with a releasing handle 20 pivoted on the lever, there being a spring 21 on the rod for pressing the pawl into engagement with the ratchet bar. In the boxing is pivoted a pawl 22 which engages the bottom set of ratchet teeth 16 so that the back and forth movement of the lever will cause the ratchet bar to move rearwardly for retracting the clearer. This pawl 22 has a laterally-extending member forming a treadle 23, and connected with this treadle is a spring 24 that is connected with the boxing 14 and is so arranged as to pull the pawl 22 upwardly and hold it yieldingly engaged with the ratchet bar. By pressing down on the treadle, the pawl 22 will be released and while held released the upper pawl is disengaged from the ratchet bar by the operator when he desires to permit the clearer to move forwardly and discharge the hay from the rake teeth. As the clearer moves forwardly, the spring reacts on the hay sweep by exerting a backward impulse so that the horses can back the sweep with less labor.

From the foregoing description, taken in connection with the accompanying drawings, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claims appended hereto.

Having thus described the invention, what I claim as new, is:—

1. The combination of a hay sweep, with a supporting frame, a horizontally-movable clearer mounted thereon, a spring connected with the clearer for moving the same forwardly, and a retracting device connected with the clearer for moving the same backwardly and placing the spring under tension.

2. The combination of a hay sweep, with a supporting frame, a hay-discharging clearer slidably mounted thereon, a single clearer actuating spring extending longitudinally of the clearer and having its front and rear ends connected respectively with the frame and clearer, and a combined means for retracting the clearer and holding the same releasably in retracted position.

3. The combination of a hay sweep, with a supporting frame, a hay-discharging clearer slidably mounted thereon, a single clearer actuating spring extending longitudinally of the clearer and having its front and rear ends connected respectively with the clearer and frame, and a device for releasably holding the clearer in retracted position.

4. The combination of a hay sweep, with a supporting frame, a clearer consisting of connected spaced bars slidably mounted on the frame and having a head on the front end of the bars, a helical extension spring extending substantially parallel with and located between the bars, means for connecting the rear end of the spring with the clearer, means for connecting the front end of the spring with the frame, and means for releasably holding the clearer in its rearward position with the spring under tension.

5. The combination of a hay sweep, with a supporting structure, a spring actuated hay-discharging clearer mounted thereon, a ratchet bar connected with the clearer, coacting pawls engaging the ratchet bar for moving the latter, means for releasing the pawls from the ratchet bar to permit the clearer to move forwardly, and a device for moving the clearer when the pawls are released.

6. The combination of a hay sweep, with a supporting structure, a hay-discharging clearer mounted thereon, a spring connected with the clearer for moving the same on its discharge stroke, a ratchet bar connected with the clearer for retracting the same against the tension of the spring, an operating lever, a pawl on the lever for engaging the ratchet bar, a second pawl coacting with the first for moving the ratchet bar by the oscillation of the operating lever, and means connected with each pawl for releasing the same to permit the clearer and rack bar to move forwardly.

7. The combination of a hay sweep, with a supporting structure, a hay-discharging clearer mounted thereon, a spring connected with the clearer for moving the same on its discharge stroke, a ratchet bar connected with the clearer for retracting the same against the tension of the spring, an operating lever, a pawl on the lever for engaging the ratchet bar and moving the same by the operating stroke of the lever, a second pawl coacting with the first for holding the ratchet bar during the return stroke of the operating lever, means mounted on the lever and connected with the pawl thereof for releasing the latter from the ratchet bar, and a pedal connected with the second-mentioned pawl for releasing the same from the ratchet bar.

8. The combination of a hay sweep, with a supporting structure, a spring-actuated hay-discharging clearer thereon, a ratchet bar having a hook at its forward end engaging the clearer, a boxing on the said structure in which the ratchet bar slides, an operating lever mounted in the boxing, a pawl on the lever for engaging the ratchet bar, means on the lever for releasing the pawl from the ratchet bar, a second pawl mounted in the boxing and arranged to engage the ratchet bar to coöperate with the lever and pawl for moving the ratchet bar step by step in the retraction of the clearer, a pedal connected with the last-mentioned pawl for releasing the same, and a spring for yieldingly holding the last-mentioned pawl engaged with the ratchet bar.

In testimony whereof I affix my signature in presence of two witnesses.

CYRUS B. PURDY.

Witnesses:
THOMAS E. CHAMBERS,
W. F. GRAHAM.

Copies of this patent may be obtained for five cents each, by addressing the "Commissioner of Patents, Washington, D. C."